US010351749B2

(12) United States Patent
Yang et al.

(10) Patent No.: US 10,351,749 B2
(45) Date of Patent: Jul. 16, 2019

(54) THERMALLY CONDUCTIVE ELASTOMERIC COMPOSITES

(71) Applicant: Dow Global Technologies LLC, Midland, MI (US)

(72) Inventors: Yunfeng Yang, Shanghai (CN); Hongyu Chen, Shanghai (CN); Tao Han, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 4 days.

(21) Appl. No.: 15/735,465

(22) PCT Filed: Jun. 18, 2015

(86) PCT No.: PCT/CN2015/081738
§ 371 (c)(1),
(2) Date: Dec. 11, 2017

(87) PCT Pub. No.: WO2016/201659
PCT Pub. Date: Dec. 22, 2016

(65) Prior Publication Data
US 2018/0163114 A1    Jun. 14, 2018

(51) Int. Cl.
| | | |
|---|---|---|
| C08L 9/00 | (2006.01) |
| C09K 5/14 | (2006.01) |
| C08L 23/16 | (2006.01) |
| C08L 53/02 | (2006.01) |
| C08K 3/04 | (2006.01) |
| C08K 3/08 | (2006.01) |
| C08K 5/14 | (2006.01) |
| C08K 7/04 | (2006.01) |

(52) U.S. Cl.
CPC .............. *C09K 5/14* (2013.01); *C08K 3/04* (2013.01); *C08K 3/08* (2013.01); *C08K 5/14* (2013.01); *C08L 23/16* (2013.01); *C08L 53/025* (2013.01); *C08K 7/04* (2013.01); *C08K 2003/0812* (2013.01); *C08K 2201/001* (2013.01); *C08K 2201/016* (2013.01); *C08L 2203/20* (2013.01); *C08L 2205/02* (2013.01); *C08L 2205/025* (2013.01); *C08L 2205/03* (2013.01); *C08L 2205/22* (2013.01); *C08L 2312/02* (2013.01)

(58) Field of Classification Search
CPC ... C08K 3/04; C08K 3/08; C08K 5/14; C08K 3/22; C08K 2201/016; C08K 2201/001; C08K 2003/0812; C08K 7/04; C08L 53/025; C08L 23/16; C08L 2313/02; C08L 2205/03; C08L 2205/025; C08L 2203/20; C08L 2205/22; C08L 2205/02
See application file for complete search history.

(56) References Cited

U.S. PATENT DOCUMENTS

| | | | |
|---|---|---|---|
| 3,107,152 A | 10/1963 | Ford et al. | |
| 3,646,846 A | 3/1972 | Houghton et al. | |
| 4,710,544 A * | 12/1987 | Wolfe, Jr. ............... | C08L 23/06 524/522 |
| 6,326,084 B1 | 12/2001 | Ouhadi et al. | |
| 6,414,081 B1 | 7/2002 | Ouhadi | |
| 7,452,594 B2 | 11/2008 | Pickering | |
| 8,283,420 B2 | 10/2012 | Chaudhary et al. | |
| 8,440,312 B2 | 5/2013 | Elahel | |
| 8,877,851 B2 | 11/2014 | Saga | |
| 2001/0002075 A1 | 5/2001 | Chaudhary et al. | |
| 2005/0090618 A1* | 4/2005 | Okuno ................... | C08L 15/005 525/232 |
| 2006/0100368 A1* | 5/2006 | Park ....................... | B82Y 30/00 525/50 |
| 2008/0277619 A1 | 11/2008 | Matsumoto et al. | |
| 2009/0314514 A1* | 12/2009 | Galletti et al. ......... | H01B 7/295 174/110 A |
| 2010/0021790 A1* | 1/2010 | Abu-Isa et al. ..... | H01M 8/0213 429/514 |
| 2012/0164570 A1 | 6/2012 | Pickering et al. | |
| 2013/0116371 A1 | 5/2013 | Oktavia et al. | |
| 2014/0087249 A1 | 3/2014 | Azami | |
| 2014/0227601 A1 | 8/2014 | Azami | |
| 2014/0339780 A1 | 11/2014 | Mazyar et al. | |
| 2015/0129190 A1 | 5/2015 | Lin | |
| 2015/0130047 A1 | 5/2015 | Tseng et al. | |
| 2015/0299455 A1 | 10/2015 | Peng et al. | |
| 2016/0177159 A1 | 6/2016 | Yang et al. | |

FOREIGN PATENT DOCUMENTS

| | | |
|---|---|---|
| CN | 103788657 A | 5/2014 |
| JP | 2005-255867 A | 9/2005 |
| JP | 2010-065064 A | 3/2010 |
| JP | 2010-132838 A | 6/2010 |
| JP | 2011-026589 A | 2/2011 |
| JP | 2011-162754 A | 8/2011 |
| JP | 2013-194223 A | 9/2013 |
| JP | 2015-205944 A | 11/2015 |

OTHER PUBLICATIONS

S. Zhou et al., Thermochimica Acta 566 (2013) 84-91.

* cited by examiner

*Primary Examiner* — Nathan M Nutter
(74) *Attorney, Agent, or Firm* — Husch Blackwell LLP

(57) ABSTRACT

A composition composed of a crosslinked interpolymer elastomer and thermally conductive filler dispersed within an elastomeric matrix, thermally conductive articles made from the composition, and methods of producing the composition and articles.

15 Claims, No Drawings

THERMALLY CONDUCTIVE ELASTOMERIC COMPOSITES

FIELD OF THE INVENTION

Embodiments of this invention relate to a composition composed of a crosslinked interpolymer elastomer and thermally conductive filler dispersed within an elastomeric matrix, thermally conductive articles made from the composition, and methods of producing the composition and articles.

BACKGROUND OF THE INVENTION

With the increasing need to dissipate heat that is generated within microelectronic, electronic, telecommunication and electric devices, thermally conductive elastomeric materials are becoming increasingly important to the overall performance of electronic device packages. Key components that provide heat dissipation in such devices include, for example, thermal interface materials (e.g., thermal pads, thermal gels, etc.) and heat conductive rubber seals, among others. High temperature resistant materials such as silicone rubber, fluoroelastomers (FPM), and thermally conductive elastomeric materials are often used for such components to dissipate and effectively manage heat that is generated within electronic devices.

Thermally conductive fillers, which can also be electrically insulating or electrically conductive, are typically added to an elastomeric material to increase thermal conductivity (Tc). Depending on the target Tc, a high volume of filler is usually needed to form the network needed to convert an elastomer material from essentially a heat insulator to a thermally conductive material. However, a high volume fraction of inorganic filler is known to have a negative effect on other properties of the elastomer material such as softness, compression set, compound viscosity, etc. In addition, there are increased costs associated with the use of a high volume of thermally conductive fillers.

Fillers, such as graphite and boron nitride, are preferred materials that generally provide a high intrinsic thermal conductivity (Tc) at a relatively low loading. Graphite and boron nitride have a layered, planar micro-structure. Typically, the layers are stacked in parallel and thus form platelet shaped particles. Atoms in the layer plane are bonded covalently, whereas bonding between layers is via weak Van der Waals bonds. Therefore, these fillers have intrinsically anisotropic (directionally dependent) thermal conductivity. When added to an elastomer material during flow processing, they tend to orient and provide a much higher Tc in the plane (or flow) direction than in the thickness direction of the material. However, a high Tc in the thickness direction of a conductive elastomer component (e.g., thermal interface pad) is crucial to heat dissipation in a device construction.

It would, therefore, be desirable to provide a thermally conductive elastomeric material that has a low filler content and/or with a high thermal conductivity (Tc) at a given filler loading in a thickness direction of the material or component.

SUMMARY OF THE INVENTION

In one embodiment the invention provides a composition comprising at least the following:
A) a continuous phase comprising an elastomer selected from the group consisting of an ethylene/α-olefin interpolymer, a propylene/α-olefin interpolymer, a propylene/ethylene interpolymer, and combinations thereof;
B) a discontinuous phase comprising a crosslinked elastomer dispersed within the continuous phase, the crosslinked elastomer selected from the group consisting of a crosslinked ethylene/α-olefin interpolymer, a crosslinked propylene/α-olefin interpolymer, a crosslinked propylene/ethylene interpolymer, and combinations thereof; and
C) a thermally conductive filler comprising a plurality of particles dispersed within the continuous phase.

In another aspect, the invention provides a crosslinked thermally conductive composition formed from the composition as disclosed herein.

In another aspect, the invention provides an article comprising at least one component formed from the composition as disclosed herein.

In yet another aspect, the invention provides a method of providing a crosslinked thermally conductive material comprising thermally conductive filler and domains of crosslinked elastomer dispersed within a continuous phase elastomer matrix.

DETAILED DESCRIPTION OF THE PREFERRED EMBODIMENT

Various embodiments of the present invention relate to a thermally conductive elastomeric composition comprising at least (a) a continuous phase comprising an elastomeric interpolymer (or elastomer) matrix, (b) a discontinuous phase comprising domains of a crosslinked elastomer dispersed or suspended within the continuous phase, and (c) a thermally conductive filler dispersed or suspended within the continuous phase. Additionally, certain embodiments concern crosslinked compositions and articles of manufacture employing such thermally conductive materials, and methods for preparing the thermally conductive materials.

In various embodiments, the elastomer of the matrix component and/or the crosslinked discontinuous phase can be a combination of two or more of the described elastomers. For example, an elastomer having one or more properties outside a desired range may be combined with a second elastomer so that the blend of the two elastomers has the desired properties.

In embodiments, the same elastomer is used for both the matrix component (continuous phase) and for the dispersed crosslinked component (discontinuous phase). In embodiments, different elastomers are used for the matrix component. Use of the same elastomer for both components promotes compatibility and a better interface between the continuous and discontinuous phases.

Production processes used for preparing the described elastomers are wide, varied, and known in the art. Any conventional or hereafter discovered production process for producing elastomers having the described properties may be employed for preparing the elastomers described herein.

Elastomeric Matrix (Continuous Phase)

As noted above, one component of the thermally conductive composition described herein is an elastomeric polymer ("elastomer") matrix as the continuous phase. In various embodiments, the elastomer is an ethylene-based interpolymer, a propylene-based interpolymer, or a combination thereof. During processing, the uncrosslinked continuous phase elastomer matrix is compounded with the filler component and the crosslinked component. The crosslinked component forms the discontinuous phase of the composition, which is dispersed within the elastomer matrix. In embodiments, the continuous phase elastomer matrix is cured such that interpolymers of the elastomer matrix are crosslinked.

In various embodiments, the thermally conductive composition comprises the elastomer matrix (continuous phase) in an amount ranging from 20 to 75 volume percent ("vol %"), or from 40 to 60 vol %, based on the total volume of the elastomer matrix, the crosslinked elastomer discontinuous phase, and the thermally conductive filler.

In embodiments, the elastomer of the elastomeric matrix has a density ranging from 0.8 to 1.4 g/cm$^3$, or from 0.85 to 0.95 g/cm$^3$. In embodiments, the elastomer of the elastomeric matrix has a melt index of ≤0.5 to 30, or of 0.5 to 20, or of 0.5 to 10, g/10 min. In embodiments, the elastomer of the elastomeric matrix has a Mooney viscosity (ML1+4, 125° C.) of from 5 to 150, or 10 to 100, or 20 to 90, or 30 to 80.

Ethylene-based Interpolymers

Ethylene-based interpolymers suitable for use herein are ethylene/alpha-olefin ("α-olefin") interpolymers, including ethylene/α-olefin/nonconjugated polyene interpolymers.

Thus, in various embodiments, the elastomer is an ethylene-based interpolymer having polymerized therein ethylene and an α-olefin comonomer. In one embodiment, the ethylene-based interpolymer is a homogeneously branched linear ethylene/α-olefin copolymer or a homogeneously branched, substantially linear ethylene/α-olefin interpolymer. The α-olefin monomers suitable for use in the elastomer component include C$_{3-20}$ (i.e., having 3 to 20 carbon atoms) linear, branched, or cyclic α-olefins. Examples of C$_{3-20}$ α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin elastomers include ethylene/propylene copolymers, ethylene/1-butene copolymers, ethylene/1-hexene copolymers, ethylene/1-octene copolymers, and ethylene/α-olefin/nonconjugated polyene interpolymers, or combinations of two or more thereof.

In embodiments, the ethylene-based interpolymer is an ethylene/α-olefin/nonconjugated polyene interpolymer. In embodiments, the ethylene/α-olefin/nonconjugated polyene interpolymer is an ethylene/α-olefin/diene terpolymer (EAODM). In embodiments, the interpolymer is an ethylene/propylene/diene terpolymer (EPDM). Illustrative dienes include 5-ethylidene-2-norbornene (ENB), dicyclopentadiene, 1,4-hexadiene, 7-methyl-1,6-octadiene. In embodiments, the diene is 5-ethylidene-2-norbornene (ENB). In embodiments, the ethylene/α-olefin/nonconjugated polyene interpolymer comprises 40 to 80 wt % ethylene, and 0.1 to 15 wt % polyene.

In embodiments, the ethylene/α-olefin/nonconjugated polyene interpolymer (e.g., EPDM) comprises a majority amount of the elastomer matrix (continuous phase) of the thermally conductive composition, based on the total volume of the continuous phase.

In embodiments, the ethylene-based interpolymer has a density ranging from 0.8 to 1.4 g/cm$^3$, or from 0.85 to 0.93 g/cm$^3$.

In embodiments, the ethylene-based interpolymer has a melt index (I$_2$) ranging from less than 0.5 to 30 g/10 min., or from 0.1, or from 0.2, or from 0.3, or from 0.4, or from 0.5, up to 30, or to 15, or to 10, or to 5, g/10 min.

In embodiments, the ethylene-based interpolymer has a Mooney viscosity, ML (1+4) at 125° C., from 5, or from 10, or from 15, or from 20, or from 30, and up to 150, or to 100, or to 90, or to 80, for example, from 20 to 80.

In embodiments, the ethylene-based interpolymer has a molecular weight distribution (Mw/Mn) from 1.5 to 8, or from 2 to 4.

Commercial examples of ethylene-based elastomers suitable for use herein include ENGAGE™ polyolefin elastomers (e.g., ENGAGE™ 8130, 8200, 8402, or 8452 polyolefin elastomers), AFFINITY™ polyolefin elastomers (e.g., AFFINITY™ GA 1875, 1900, 1000R, 1950), and NORDEL™ IP EPDM elastomers (e.g., NORDEL™ IP 4570), all available from The Dow Chemical Company, Midland, Mich., USA. Additional commercially available ethylene-based elastomers include EXACT™ plastomers and VISTALON™ EPDM rubber, all available from ExxonMobil Chemical, Houston, Tex., USA.; TAFMER™ α-olefin copolymers, Mitsui EPT EPDM rubber, available from Mitsui Chemicals Group, Tokyo, Japan; Keltan™ EPDM rubber from Lanxess, Colon, Germany; ROYALENE™ and ROYALEDGE™ EPDM rubber from Lion Copolymer, LA, USA.; KEP EPDM rubber from Kumho, Korea; SUPRENE™ EPDM rubber from SK Chemical, Korea; JSR EPDM rubber from Japan Synthetic Rubber Corporation, Japan; ESPRENE™ EPDM rubber from Sumitomo Chemical, Japan; DUTRAL™ EPDM rubber from Versalis S.P.A., Italy; and KUNLUN™ EPDM rubber from China National Petrochemical Corporation.

Propylene-based Interpolymers

Propylene-based interpolymers suitable for use herein are propylene/α-olefin interpolymers and propylene/ethylene interpolymers. Thus, in various embodiments, the elastomer is a propylene-based interpolymer having polymerized therein propylene and an α-olefin comonomer. In embodiments, the elastomer is an interpolymer of propylene and ethylene.

In embodiments, the propylene-based interpolymer is an ethylene/propylene/nonconjugated polyene interpolymer with a majority weight of propylene (based on the weight of the interpolymer). In embodiments, the ethylene/propylene/nonconjugated polyene interpolymer is an ethylene/propylene/diene terpolymer (EPDM). Illustrative dienes include 5 ethylidene-2-norbornene (ENB), dicyclopentadiene, 1,4 hexadiene, 7-methyl-1,6-octadiene. In embodiments, the diene is 5-ethylidene-2-norbornene (ENB). In embodiments, the ethylene/propylene/nonconjugated polyene interpolymer comprises 30 to 45 wt % ethylene, 45 to 70 wt % propylene, and 0.1 to 15 wt % polyene.

In embodiments, the ethylene/propylene/nonconjugated polyene interpolymer (e.g., EPDM) comprises a majority amount of the elastomer matrix (continuous phase) of the thermally conductive composition, based on the total volume of the continuous phase.

In embodiments, the propylene-based interpolymer has a melt flow rate (MFR, as measured by ASTM D1238 at 230° C./2.16 kg), prior to crosslinking, of less than 60 g/10 min., and at least 0.5, or at least 1, up to 30, or up to 25, g/10 min. In embodiments, the propylene-based interpolymer exhibits a peak melting point (T$_{max}$), as determined by differential scanning calorimetry (DSC), of 15 to 95° C.

In embodiments, the propylene-based interpolymer has a density ranging from 0.8 to 1 g/cm$^3$, or from 0.85 to 0.95 g/cm$^3$.

In embodiments, the propylene-based interpolymer has a melt index (I$_2$) ranging from less than 0.5 to 30 g/10 min., or from 0.1, or from 0.2, or from 0.3, or from 0.4, or from 0.5, up to 30, or to 15, or to 10, or to 5, g/10 min.

In embodiments, the propylene-based interpolymer has a Mooney viscosity, ML (1+4) at 125° C., from 5, or from 10, or from 15, or from 20, or from 30, and up to 150, or to 100, or to 90, or to 80.

In embodiments, the propylene-based interpolymer has a molecular weight distribution (Mw/Mn) from 1.5 to 6, or from 2 to 4.

In embodiments, the propylene polymer can be isotactic, syndiotactic or atactic polypropylene.

In embodiments, the elastomer is a random propylene interpolymer. Random propylene interpolymers typically comprise 90 or more mole % units derived from propylene, with the remainder of the units derived from units of at least one α-olefin. The α-olefin component of the random propylene copolymer is preferably ethylene (considered an α-olefin for purposes of this invention) or a $C_{4-20}$ linear, branched or cyclic α-olefin, as discussed herein. Illustrative random polypropylene interpolymers include but are not limited to propylene/ethylene, propylene/1-butene, propylene/1-hexene, propylene/1-octene, and the like.

Random copolymer polypropylenes are commercially available and include VERSIFY™ propylene-based elastomers, available from The Dow Chemical Company; and VISTAMAXX™ propylene-based elastomers, available from ExxonMobil Chemical, Houston, Tex., USA.

Crosslinked Elastomer (Discontinuous Phase)

Dispersed or suspended within the elastomeric matrix continuous phase are domains (or "islands") of crosslinked elastomeric polymer as a discontinuous phase. In various embodiments, the crosslinked elastomer is a crosslinked ethylene-based interpolymer, a crosslinked propylene-based interpolymer, or combination thereof. Ethylene-based interpolymers and propylene-based interpolymers suitable for use as the crosslinked elastomer component are ethylene/α-olefin interpolymers and propylene/α-olefin interpolymers, and combinations thereof, as described herein.

In embodiments, the crosslinked elastomer component of the discontinuous phase of the composition is combined with the elastomers of the continuous phase as pre-formed particles. The particles can be formed by crosslinking the elastomers (interpolymers) in a conventional manner, for example, using a free radical intiator such as peroxides, phenols, azides, among others. The crosslinked material can be formed into particles by mechanical crushing or grinding. The shape of the particles, and thus the dispersed domains of the crosslinked elastomer within the composition, can vary. In embodiments, the particles (i.e., the dispersed domains) forming the discontinuous phase of the composition have an average diameter or width that is greater than or equal to 20, or greater than or equal to 30, or greater than or equal to 40, or greater than or equal to 50, and less than or equal to 500 µm, or less than or equal to 400 µm, or less than or equal to 300 µm, or less than or equal to 200 µm, or less than or equal to 100 µm. In embodiments, the particles have an average diameter or width of 20 to 500 µm, or 50 to 200 µm.

In embodiments, the elastomer component of the discontinuous phase is crosslinked to a degree to provide a crosslinked material having a gel content of greater than or equal to 20 wt %, or greater than or equal to 30 wt %, or greater than or equal to 40 wt %, or greater than or equal to 50 wt %, or greater than or equal to 60 wt %, or greater than or equal to 70 wt %, or greater than or equal to 80 wt %, or greater than or equal to 90 wt %, up to 100 wt %, insolubles. The degree of crosslinking can be measured by dissolving the crosslinked elastomer component in a solvent for a specified duration, and calculating the percent gel or unextractable component. For example, see the Gel Content determine below. In one embodiment, the crosslinked elastomer has a gel content from 20 to 100 wt %, further from 30 to 100 wt %, further from 40 to 100 wt %, further from 50 to 100 wt %, further from 60 to 100 wt %, further from 70 to 100 wt %, further from 80 to 100 wt %, and further from 90 to 100 wt %, based on the weight of the elastomer. The gel content can be measured by dissolving the crosslinked elastomer component in a solvent for a specified duration, and calculating the percent gel or unextractable component. For example, see the Gel Content determination below.

Thermally Conductive Filler

As noted above, thermally conductive filler is dispersed or suspended within the continuous phase elastomeric matrix with the crosslinked elastomeric polymer domains.

In various embodiments, the thermally conductive filler has a thermal conductivity of greater than or equal to 20 Watts per meter per Kelvin (W/m K), or greater than or equal to 30, or greater than or equal to 50, or greater than or equal to 100, or greater than or equal to 200, up to 1500, or up to 1000, or up to 800, W/m K. In embodiments, the thermally conductive filler has a thermal conductivity ranging from 20 to 1500, or 50 to 1000, or from 100 to 800, W/m K.

Examples of thermally conductive fillers suitable for use herein include, but are not limited to, graphite, aluminum, aluminum oxide ($Al_2O_3$), magnesium oxide (MgO), boron nitride (BN), zinc oxide (ZnO), silicon carbide (SiC), aluminum nitride (AlN), carbon fiber, silicon nitride, graphene nanoplatelets, zinc sulfide, and combinations thereof. In embodiments, the thermally conductive filler is selected from the group consisting of graphite and aluminum. Tc values of such fillers are known in the art. See, for example, *Handbook of Fillers (Materials Science)*, by George Wypych (Author), ISBN-13: 978-1884207693.

In embodiments, the filler particles have an average aspect ratio of from 1:1 to 1:100, or from 1:5 to 1:80, and preferably from 1:10 to 1:50. The particles can be shaped as platelets or plates (i.e., platy-shaped), fibers (i.e., fibrous material), rods, needles, granules, spheres, or any combination thereof. In general, platy-shaped particles have a relatively large particle diameter and relatively small thickness, and rod-, needle- and fibrous-shaped particles have a relatively small diameter and long length. In embodiments, the thermally conductive filler is a platy shape.

The shape of the particles of the thermally conductive filler can be confirmed, for example, by SEM (scanning electron microscope) observation. That is, in a SEM image, the particles are considered to have a platy-shape where the average aspect ratio (i.e., ratio of width (or diameter) to thickness) is 10:1, or 30:1. The particles are considered to have a rod, needle or fibrous shape where the average aspect ratio (i.e., length to diameter) is 30:1, or 100:1. The particles are considered to have a spherical or granular shape where the average aspect ratio (i.e., ratio between the long and short axes of the particle) is less than 2, or 1.5:1, or 1.2:1.

In embodiments, the particles are platy-shaped particles with an average width or diameter of 5 to 300 µm, and an average thickness of 0.5 to 10 µm. In embodiments, the particles are rod-, needle- and fibrous-shaped with an average diameter of 0.5 to 10 µm and an average length of 15 to 500 µm. In embodiments, the particles are spherical or granular-shaped with an average diameter of 5 to 200 µm.

In embodiments, the composition includes an amount of the thermally conductive filler to provide an overall thermal conductivity of at least 0.5, or at least 1.0, or at least 1.5, and up to 10.0, or up to 8.0, or up to 5.0, W/m K, and, in embodiments, 1.0 to 10.0, or 1.5 to 8, W/m K. In one or more embodiments, the thermally conductive filler can be present in the thermally conductive material in an amount of greater than or equal to 20, or greater than or equal to 30, and up to 60, or up to 50, vol %, based on the total volume of the composition. In embodiments, the amount of the thermally conductive filler ranges from 20 to 60 vol %, preferably from 30 to 50 vol %, based on the total volume of the composition.

Thermally conductive fillers are known in the art and commercially available. Examples of commercially available thermally conductive fillers of different particle sizes for use herein include graphite platelets available from Qingdao Tianheda Graphite Co. Ltd (China), fibrous-shaped particles available from Nippon Graphite Fiber Corporation, and sphere-shaped particles available from Henan Yuanyang Aluminum Industry Co., Ltd (China).

In embodiments, the thermally conductive filler can be a single filler or a combination of two or more fillers that differ in at least one property such as particle shape, average particle size, particle size distribution, and type of filler.

Additives

The thermally conductive elastomeric composition can optionally include one or more compatible additives, including, but are not limited to, crosslinking agents, coagents, mineral oil, antioxidants, coupling agents, plasticizers, processing aids, fire retardants, fillers (non-thermally conducting), ultraviolet absorbers or stabilizers, colorants or pigments, and antioxidants, among others. Such additives can be employed in a desired amount to achieve their desired effect. Typically, such additives can be used in amounts ranging from less than 0.01 to 50 vol %, based on the total volume of the composition.

In various embodiments, the compositions can further include one or more crosslinking agents. Examples of crosslinking agents include, but are not limited to a sulfur cure agents, azo-compounds, silanes (e.g., vinyl tri-ethoxy or vinyl tri-methoxy silane), peroxides, and other types of radical generators (e.g. N—O break type and C—C break type), among others.

In embodiments, one or more coagents (co-activators) and/or accelerators, can be used in combination with a crosslinking agent. Examples of suitable coagents include, but are not limited to multifunctional (meth)acrylate esters (e.g., trimethylolpropane triacrylate (TMPTA)) dimaleimides, zinc salts of (meth)acrylic acid, allyl-containing cyanurates (e.g., triallyl cyanurate (TAC)), allyl-containing isocyanurates (e.g., triallyl isocyanurate (TAIL)), allyl-containing phthalates, homopolymers of dienes, and co-polymers of dienes and vinyl aromatics, among others. Typically, a coagent can be present in the thermally conductive composition in an amount ranging from 0.1 vol % to 0.8 vol %, based on the total volume of the composition. Examples of accelerators include, but are not limited to, sulfonamides, amines, disulfides, guanidines, thioureas, thiazoles, thiurams, dithiocarbamates and xanthates, among others.

Mineral oil can be included as a processing aid to facilitate compounding and ensure a workable mixture and good dispersion and also as a softness increasing agent, e.g., when a large quantity of filler is present in the composition. Examples of suitable mineral oils include paraffinic, naphthenic, and aromatic oils, among others. In embodiments, the composition comprises 10 to 40 vol % mineral oil, based on the total volume of the composition.

Examples of suitable antioxidants include, but are not limited to, hindered phenols, bisphenols, and thiobisphenols, and substituted hydroquinones, among others.

Examples of coupling agents include, but are not limited to, silane coupling agents, titanate coupling agents, zirconium coupling agents, magnesium coupling agents and tin coupling agents, among others.

Examples of plasticizers include, but are not limited to, phthalates, benzoates, dibenzoates, thermoplastic polyurethane plasticizers, phthalate esters, naphthalene sulfonate, trimellitates, adipates, sebacates, maleates, sulfonamides, organophosphates, and polybutene, among others.

Examples of processing aids include, but are not limited to, waxes (e.g., polyethylene waxes, vegetable waxes, petroleum waxes), metal salts of carboxylic acids (e.g., zinc stearate, calcium stearate, etc.), fatty acids (e.g., stearic acid, oleic acid, erucic acid, etc.), fatty amides (e.g., stearamide, etc.), polymers of ethylene oxide, copolymers of ethylene oxide and propylene oxide, nonionic surfactants, and polysiloxanes, among others. Processing aids can be used in amounts of 0.5 to 5.0 vol %.

Suitable flame retardants include, but are not limited to, magnesium hydroxide, aluminum trihydroxide (ATH), calcium phosphate, titanium oxide, zinc oxide, magnesium carbonate, barium sulfate, barium borate, kaolinite, silica, antimony oxides, halocarbons, halogenated esters, halogenated ethers, brominated flame retardant agents, and halogen free compounds such as organophosphorus compounds, organonitrogen compounds, intumescent flame retardants, among others. In embodiments, the composition includes 10 to 30 vol % of one or more flame retardants, based on the total volume of elastomeric components in the composition.

Suitable non-thermally conducting fillers include, but are not limited to, clays, talc, titanium dioxide, calcium carbonate, zeolites, etc., carbon black, and fibers such as glass fibers, steel wire or mesh, nylon or polyester fibers, metal fibers, etc. In embodiments, the filler can be present in an amount of from 0.01 to 10 vol %, based on the total volume of the composition.

Compounding

The compositions can be prepared by conventional or hereafter discovered procedures that provide a mixture of the components as described herein, using equipment such as, but not limited to, mixers for melt blending of the components, and equipment used for continuous mixing procedures including single and twin screw extruders, static mixers, Farrel continuous mixer, as well as other machines and processes designed to disperse the components in intimate contact.

In embodiments, the thermally conductive filler can be melt-mixed in an elastomer to make a filler-containing masterbatch. In embodiments, the elastomer used as the elastomeric matrix (continuous phase) is used to prepare the filler masterbatch. The filler loading in the masterbatch phase can be in the range of from 30 to 90 vol %, or from 40 to 85 vol %, or from 60 to 80 vol %. Melt mixing of the filler and the elastomer can be achieved by conventional or hereafter discovered melt-mixing procedures. For example, melt extrusion or mixing in a HAAKE melt mixer can be employed. Once the filler-containing masterbatch has been prepared, it can then be added to the elastomer matrix component in an amount determined to provide the desired concentration of filler in the end product composition. In embodiments, the filler-containing masterbatch is melt-mixed with the elastomer matrix component of the continuous phase using a melt-mixing method. Additives, if employed, can be melt-mixed at any time, either in the masterbatch phase, the non-masterbatch phase, or the combined material.

In embodiments of the composition, the combined vol % of the elastomeric matrix (continuous phase) (component A), the crosslinked elastomeric discontinuous phase (component B), the thermally conductive filler (component C), in the composition, is greater than or equal to ($\geq$) 95 vol %, or greater than or equal to 98 vol %, or greater than or equal to 99 vol %, of the total volume of the composition.

In embodiments, the thermally conductive filler component (C) is present in an amount of from 20 to 60 vol %, or from 30 to 50 vol %, based on the total volume of Components A, B and C. In embodiments, the elastomeric matrix component (continuous phase) is present in an amount of 20 to 75 vol %, based on the total volume of components A, B and C. In embodiments, the crosslinked elastomer component (discontinuous phase) is present in an amount of 5 to 25 vol %, based on the total volume of components A, B and C.

In an embodiment, the wt % of Component A is 5 to 70, the wt % of Component B is 1 to 40, and the wt % of Component C is 25 to 90.

In embodiments, the volume ratio of Component A to Component B is from 4:5 to 15:1. In embodiments, the volume ratio of Component A to Component C is from 1:3 to 15:4. In embodiments, the volume ratio of Component B to Component C is from 1:12 to 5:4.

In an embodiment, the weight ratio of Component A to Component B is from 3:7 to 26:1. the weight ratio of Component A to Component C is from 1:21 to 21:8. the weight ratio of Component B to Component C is from 1:84 to 7:8.

In embodiments, the thermally conductive composition has a thermal conductivity of greater than or equal to 0.5 Watts per meter per Kelvin (W/m·K), or greater than or equal to 1.0, and up to 20, or up to 10, W/m·K.

In embodiments, the thermally conductive composition has a melting point of 30° C. to 130° C., a Shore A hardness of 40 to 90, a Shore D hardness of 10 to 40, and a tensile modulus of 10 to 500 MPa.

The compositions may comprise a combination of two or more embodiments described herein.

Crosslinked Compositions

In various embodiments, the thermally conductive composition can be crosslinked in a conventional manner in the presence of a free radical initiator or by ionizing radiation according to known techniques.

Examples of crosslinking agents include, but are not limited to, free radical initiators such as peroxides, azo compounds, silanes, and phenolic resins, among others. Organic initiators are preferred, such as any one of the peroxide initiators, such as dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate, among others. Suitable azo compounds include 2,2'-azobis(isobutyronitrile), among others. Suitable vinyl silanes include vinyl trimethoxysilane and vinyl triethoxysilane, among others.

A crosslinking agent can optionally be used in combination with one or more coagents (co-activators) and/or accelerators. The amount of crosslinking agent used can be in the range of 0.5 to 5 vol %, based on the total volume of the composition. Crosslinking temperatures are generally in the range of 50° C. to 250° C.

In embodiments, crosslinking can also be obtained by with irradiation (e.g., e-beam or x-ray radiation) or moisture, according to known techniques.

The degree of crosslinking can be measured by dissolving the composition in a solvent (e.g., xylene or decalin) for a specified duration, and calculating the percent gel or unextractable component. Gel content can be determined according to ASTM D2765. In general, the percent gel typically increases with increasing crosslinking levels. In embodiments, the composition is crosslinked to a degree so as to provide a cured article having a percent gel content of at least 20 wt %, or at least 30 wt %, or at least 40 wt %, or at least 50 wt %, or at least 60 wt %, or at least 70 wt %, or at least 80 wt %, and up to 100 wt %, or up to 90 wt %, based on the total weight of the continuous phase elastomer matrix, as measured using xylene extractables. In embodiments, crosslinked composition has a gel content of from 20 to 100 wt %, further from 30 to 100 wt %, further from 40 to 100 wt %, further from 50 to 100 wt %, further from 60 to 100 wt %, further from 70 to 100 wt, further from 80 to 100 wt %, and further from 90 to 100 wt %, based on the total weight of the continuous phase elastomer matrix, as measured using xylene extractables.

Embodiments of the invention provide an island-sea structured, thermally conductive composite based on an elastomeric matrix (e.g., EPDM) and thermally conductive fillers with a high Tc level (e.g., graphite). In embodiments, the thermally conductive filler (e.g., graphite) is homogeneously distributed but oriented substantially in one direction in the elastomer matrix. In embodiments, a crosslinked elastomer powder is incorporated into the elastomeric matrix as a dispersed (island) phase during compounding. In embodiments, the thermally conductive filler is concentrated within the elastomer matrix (sea) continuous phase, with substantially no filler within the crosslinked elastomer (island) dispersed phase. Thus, more continuous thermally conductive pathways can be formed and a higher thermal conductivity can be achieved.

In embodiments, the crosslinked elastomer powder dispersed phase can act as an obstacle to interrupt the orientation of the thermally conductive filler (e.g., graphite) during processing before vulcanization (crosslinking) of the matrix elastomer.

In embodiments, the orientation of the thermally conductive filler (e.g., graphite) within the elastomeric matrix continuous phase is controlled to achieve a high thermal conductivity (Tc) by the presence and interaction of a crosslinked elastomeric dispersed phase.

In embodiments, a high amount of the thermally conductive filler (e.g., graphite) is re-oriented from the flow (plane) direction to the thickness direction by the presence of the crosslinked elastomeric dispersed phase, resulting in a heat conductive pathway that desirably increases Tc in the thickness direction of the thermally conductive material. In embodiments, the thermally conductive material of the invention has a Tc that is twice the level as a thermally conductive material that does not include a crosslinked elastomeric dispersed phase in an island/sea structure as provided herein.

In embodiments, a majority of the thermally conductive filler is oriented in a thickness direction of the material. In embodiments, the thermal conductivity (Tc) of the material is at least two times greater in the thickness direction than the same material but without the dispersed crosslinked elastomer domains.

Articles of Manufacture

The compositions of the present invention may be used to prepare a variety of articles of manufacture, or their component parts or portions thereof. In embodiments, the composition including a crosslinking agent can be fabricated into an article and the temperature raised to allow the crosslinking of the elastomer matrix (continuous phase). In another embodiment, the composition including a crosslinking agent can be fabricated into an article and exposed to a radiation source to allow crosslinking of the composition.

The inventive compositions may be processed into an article by any one of a number of conventional techniques and apparatus. Illustrative processes include, but are not limited to, injection molding, extrusion molding, thermoforming, compression molding, rotomolding, slush molding, over molding, insert molding, blow molding, calendering, and other processing techniques that are well known to those skilled in the art. Films, including multi-layer films, may be produced by cast or entering process, including blown film processes.

Articles include, but are not limited to, sheets, molded goods and extruded parts. Additional articles include automotive parts, weather strips, belts, hoses, wire and cable jacketing and insulations including flame retardant versions, seals, O-rings, tire components, computer parts, building materials, electronic materials, among other applications.

In various embodiments, the crosslinked thermally conductive composition can be employed as a thermal interface material in a variety of articles of manufacture. In various embodiments, the thermally conductive material can be employed in an article of manufacture comprising a heat-generating component, a heat-dissipating component, and a thermal interface material, where the thermal interface material is positioned so as to transfer heat from the heat-generating component to the heat-dissipating component, and where the thermal interface material comprises the above-described thermally conductive material. Examples of heat-generating components include, but are not limited to, microprocessors, central processing units, and graphics processors. An example of a heat-dissipating component includes, but is not limited to, a heat sink.

In various embodiments, the crosslinked thermally conductive composition can be employed as an elastomeric seal. Such seals can be used in telecommunication devices, pumps, valves, and the like. The seals can be any shape including O-rings, T-rings, gaskets, and the like.

An article may comprise a combination of two or more embodiments described herein.

Definitions

Unless stated to the contrary, implicit from the context, or customary in the art, all parts and percents are based on weight, and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the optical cable protective components made from these compositions are defined.

"Aspect ratio," as used herein, refers to a ratio of an average value of the longest dimension to the average value of the shortest dimension. With respect to particles that have a non-fibrous platy (plate-like) shape, aspect ratio refers to a ratio of an average value of particle width or diameter (i.e., the longest dimension) to the average value of the particle thickness (i.e., the shortest dimension). With respect to rods, needles and fibrous particles, aspect ratio refers to a ratio of an average value of the particle length (i.e., the longest dimension) to the average value of the particle width or diameter (i.e., the shortest dimension). With respect to spheres, the aspect ratio refers to the ratio between the long and short axes of the particle.

"Composition" and like terms, as used herein, mean a mixture or blend of two or more components.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Continuous phase" is an art-recognized term meaning a component that disperses or suspends other components in a disperse or multi-phase system, also called "sea" phase (versus "island" phase).

"Crosslinked," "cured," and like terms, as used herein, refer to a composition or component of the composition that was subjected or exposed to a treatment which induced crosslinking to provide a composition or component having a gel content of 20 to 100 wt % insolubles. The degree of crosslinking may be measured according to ASTM 2765-84 by dissolving the composition or component in a solvent that dissolves the composition or component prior to crosslinking (e.g., xylene or decalene) for a specified duration, and calculating the percent gel or unextractable component. The percent gel content normally increases with increasing crosslinking levels.

"Elastomer" and like terms, as used herein, denote a polymer having viscoelasticity. Generally, elastomers will have lower tensile modulus and higher failure strain relative to other materials, such as thermoplastics.

The term "ethylene-based polymer," as used herein, refers to a polymer that comprises, in polymerized form, a majority weight percent (wt %) of ethylene (based on the weight of the polymer), and, optionally, at least one comonomer.

The terms "ethylene-based interpolymer," "ethylene-based elastomer," and like terms, as used herein, refers to a polymer that comprises, in polymerized of ethylene (based on the weight of the polymer), and at least one comonomer. In one embodiment, the "ethylene-based interpolymer" comprises a majority weight percent of ethylene (based on the weight of the interpolymer).

The term "ethylene/α-olefin interpolymer," as used herein, refers to a interpolymer that comprises, in polymerized form, ethylene, and at least an α-olefin. In one embodiment, the "ethylene/α-olefin interpolymer" comprises a majority weight percent of ethylene (based on the weight of the interpolymer).

The term "ethylene/α-olefin copolymer," as used herein, refers to a copolymer that comprises, in polymerized form, a majority weight percent (wt %) of ethylene monomer (based on the weight of the copolymer), and an α-olefin, as the only two monomer types.

The term "ethylene/α-olefin/diene interpolymer," as used herein, refers to a polymer that comprises, in polymerized form, ethylene, at least an α-olefin, and a diene. In one embodiment, the "ethylene/α-olefin/diene interpolymer" comprises a majority weight percent of ethylene (based on the weight of the interpolymer). In one embodiment, the "ethylene/α-olefin/diene interpolymer" comprising a majority weight percent of propylene (based on the weight of the interpolymer).

The term "ethylene/α-olefin/diene terpolymer," as used herein, refers to a polymer that comprises, in polymerized form, ethylene, an α-olefin, and a diene, as the only three monomer types. In one embodiment, the "ethylene/α-olefin/diene terpolymer" comprises a majority weight percent of ethylene (based on the weight of the terpolymer). In one embodiment, the "ethylene/α-olefin/diene terpolymer" comprising a majority weight percent of propylene (based on the weight of the interpolymer).

"Fibrous particles" and like terms, as used herein, refer to the particle in the form of threads, filaments or fibers, including twisted filaments as a single multiple-ply fiber, woven structures and other forms such as braids.

"Interpolymer" and like terms, as used herein, mean a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

"Platy," "plate-like, and like terms, as used herein, refer to the morphology or shape of a particle as resembling a thin, flat plate or sheet.

"Polymer" and like terms, as used herein, refer to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined herein. Trace amounts of impurities, such as catalyst residues, can be incorporated into and/or within the polymer.

"Polyolefin elastomer" and like terms, as used herein, denote a thermoplastic elastomer interpolymer prepared from two or more types of α-olefin monomers, including ethylene monomers. In general, polyolefin elastomers can be substantially linear and can have a substantially homogeneous distribution of comonomer.

"Propylene-based polymer," as used herein, refer to a polymer that comprises, in polymerized form, a majority weight percent (wt %) of propylene monomer (based on the total weight of the polymer), and, optionally, at least one comonomer.

The terms "propylene-based interpolymer," propylene-based elastomer" and like terms, as used herein, refer to a polymer that comprises, in polymerized form, a majority weight percent (wt %) of propylene monomer (based on the total weight of the polymer), and at least one comonomer.

"Propylene/α-olefin copolymer," as used herein, refers to a copolymer that comprises, in polymerized form, a majority amount of propylene monomer (based on the weight of the copolymer), and an α-olefin, as the only two monomer types.

"Propylene/ethylene copolymer," as used herein, refers to a copolymer that comprises, in polymerized form, a majority weight percent (wt %) (i.e., >50 wt %) of propylene monomer (based on the weight of the copolymer), and ethylene, as the only two monomer types.

"Random copolymer," and like terms, as used herein, mean a copolymer in which the monomer is randomly distributed across the polymer chain.

"Thermally conductive filler" as used herein, is a filler that is capable of conducting heat. In embodiments, the thermally conductive filler is capable of conducting heat and is electrically insulating. In other embodiments, the thermally conductive filler is capable of conducting heat and is electrically conductive.

Test Methods

Compression Set. The compression set of test samples was measured according to GB/T 7759-1996 under conditions: 90° C., 168 hrs. with a compression ratio of 25%; Size: A type. The compression set measurement was an average of three (3) samples. D792. Each test sample was prepared by cutting round plates with a 3-cm diameter from the compression molded plaques described in the experimental section, and then stacking four round plates (face-to-face) into one test sample.

Density. Polymer densities in g/cm$^3$, as provided herein, are determined according to ASTM International ("ASTM") method D792.

Gel Content. Gel content (insoluble fraction) is determined by extraction in boiling xylene at 170° C. for 12 hours according to ASTM D2765. Ten grams crosslinked elastomer pellets with a particle size of about 3 mm are used for the test. The gel content result is obtained by taking an average of 3 test samples.

Melt Flow Rates (MFR). Melt flow rates (MFR), in g/10 minutes, as provided herein, are determined according to ASTM D1238 (at 230° C./2.16 kg).

Melt Index. Melt indices ($I_2$) provided herein are determined according to ASTM method D1238. Unless otherwise noted, melt indices ($I_2$) are determined at 190° C./2.16 kg, and reported in grams eluted per 10 minutes.

Melting Point. Melting point is determined by differential scanning calorimetry. The measurements are performed on a DSC-Q2000 instrument under nitrogen atmosphere. About 8 mg of sample is used. Apply a dynamic temperature scan from room temperature to 180° C. at a heating rate of 10° C./minute. Conduct two scans using the same ramp rate, and the phase-change temperature is obtained from the second scan. Cooling scan was conducted after the first heating scan.

Molecular Weight/Molecular Weight Distribution. Molecular weight ($M_w$) as g/mol and molecular weight distribution (MWD) ($M_w/M_n$) ($M_w$ defined as weight average molecular weight and $M_n$ as number average molecular weight), also referred to as a "polydispersity index" (PDI), is determined by gel permeation chromatography.

Mooney Viscosity, MV. Mooney Viscosity, MV is measured as ML (1+4125°) C. according to ASTM D1646 unless otherwise specified. Mooney viscosity is that of the neat interpolymer (no oil, no filler).

Morphology Observations. The prepared plaque samples from the experimental section were cut into pieces that were 0.5 cm (width)×1.0 cm (length)×3 mm (thickness) for cross-section imaging. Polished pieces were observed by back scattering electron detector using a Nova Nano630 SEM.

Shore A Hardness. Shore A Hardness (@10 sec.) was determined according to ASTM method D2240, based on an indentation measured at a specified time of ten (10) seconds. Sample specimens were cut from compression molded plaques from the experimental section. The Shore A hardness measurement was an average of three (3) samples.

Thermal Conductivity (Tc). A steady-state heat flow method (DRL-II apparatus, which conforms to ASTM D5470-2006) was used for thermal conductivity (Tc) measurements. The samples for Tc measurement were cut from the compression molded vulcanized plaques, as described in the experimental section. Sample size was 30 mm (diameter)×3 mm (thick). The measurement temperature was approx. 60° C. The Tc measurement was an average of three (3) samples.

Specific Embodiments

Materials and Reagents
In the Examples detailed below, the following materials are employed:

Preparation of Inventive & Comparative Examples
Sample Compounding
All samples were compounded using a laboratory scale HAAKE mixer. The HAAKE mixer was initially set at 90° C. and a rotor speed of 80 to 100 revolutions per minute (rpm).

The fillers (i.e., graphite, aluminum powder), EPDM powder, crosslinker and co-agent were mixed together by shaking to form a blend. The EPDM rubber (or silicone rubber) was initially loaded into the HAAKE mixer chamber for compounding until the chamber temperature was raised to around 90° C. The filler blend was then added slowly to the mixture as four separate additions. If needed, the mineral oil was loaded slowly after each addition of the filler mixture, to ensure that torque did not decrease sharply. After all the components were added, the blend was mixed together, e.g., for an additional 5 minutes. In order to prevent crosslinking, the melt temperature was controlled to less than 125° C. throughout the compounding process.

Preparation of Plaques by Compression Molding
The composites obtained from HAAKE mixing were compression molded (at 120° C. and 20 MPa for 30 seconds) into "6 cm×6 cm×3 mm" plaques. The prepared plaques were then vulcanized at 180° C. under 10 MPa for 16 min. The obtained plaque samples of vulcanized rubber composite were used for thermal conductivity, Shore A hardness, and compression set measurements. Each measurement was analyzed by the following methods.

Conversion of Sample Weight % (Wt %) to Volume % (Vol %)
For each of the samples, the weight percent (wt %) of the components was converted to volume percent (vol %) based on the density of each component.

Table 2, below, provides an example of the calculation of wt % to vol % for components of inventive sample TS2a from Table 3, below.

TABLE 1

Raw materials

| Component | Material | Specification | Density (g/cm³) | Supplier |
|---|---|---|---|---|
| Ethylene-based elastomer | EPDM 1 rubber powder | NORDEL ™ IP 4570, amorphous EPDM (5 wt % ENB; Mooney visc. 70 MU) | 0.860 | The Dow Chemical Company |
| Thermally Conductive Filler | Graphite (platelets) | High purity, 100 mesh, 200 mesh | 2.25 | Qingdao Tianheda Graphite Co., LTD |
| | | High heat conductive grade, 200 mesh | 2.25 | Shanghai Humai Composite Materials Manufacturing Co., LTD |
| | Aluminum (Al) powder | Spherical (diam. 50-60 μm) | 2.7 | Henan Yuanyang Aluminum Industry Co., LTD |
| Processing aid | Mineral Oil | HYDROBRITE ® 550 PO White Mineral Oil | 0.86 | Sonneborn, Inc. |
| Crosslinked elastomer | Crosslinked rubber elastomer | EPDM powder, 120 mesh (gel content of 91%, as determined by ASTM D2765) | 1.1 | Changzhou Ruibang Polymer material Co., LTD |
| Processing aid (softener) | Silicone rubber | 110 methyl vinyl silicone rubber | 0.98 | Dongjue Silicone Group Co., Limited |
| Crosslinker | Dialkyl peroxide | LUPEROX ® F40 | 1.08 | Arkema, Inc. |
| Co-agent | Polybutadiene Resin | RICON ® 153D (Mn = 4700) | 2.21 | Sartomer Co. |

TABLE 2

Calculation of wt % to vol % for Sample TS2a

| Component | Weight (gram) | Density (g/cm$^3$) | Volume (mL) | Volume % |
|---|---|---|---|---|
| EPDM Nordel ™ IP 4570 | 19.4 | 0.86 | 22.6 | 45 |
| EPDM powder | 8.25 | 1.1 | 7.5 | 15 |
| Graphite (Tianheda, 200 mesh) | 30 | 2.25 | 13.3 | 26.7 |
| Aluminum (Al) powder | 18 | 2.7 | 6.7 | 13.3 |

EXAMPLES

Study 1

Three test samples (TS1, TS2a, TS2b) according to the invention, and two comparative samples (CS1, CS2) were prepared according to the formulations provided in Table 3, below.

TABLE 3

Compositions and Properties of Samples S1-S3 and CS1-CS3

| Composition (vol. %) | CS1 | TS1 | CS2 | TS2a | TS2b |
|---|---|---|---|---|---|
| EPDM Nordel ™ IP 4570 | 60 | 41.8 | 60 | 45 | 48 |
| Graphite (Humai), platelets | 40 | 5 | — | — | — |
| Graphite (Tianheda) 200 mesh, platelets | — | — | 26.7 | 26.7 | 26.7 |
| Crosslinked EPDM powder | — | 18.2 | — | 15 | 12 |
| Al powder | — | — | 13.3 | 13.3 | 13.3 |
| Luperox F40 Crosslinker[1] | 6.0 | 6.0 | 6.0 | 6.0 | 6.0 |
| Ricon 153D Co-agent[1] | 3.0 | 3.0 | 3.0 | 3.0 | 3.0 |
| Thermal conductivity (Tc) (W/m · K) | 1.03 | 1.89 | 1.26 | 2.54 | 2.10 |
| Shore A Hardness | — | — | 90 | 90 | 90 |
| Compression set (%) | — | — | 25.5 | 21.3 | 25.8 |

[1]The amounts of the crosslinker and the co-agent were based on the total weight of the (uncrosslinked) EPDM interpolymer.

As shown in Table 3, comparative sample CS1 was prepared with 60 vol % EPDM as a continuous phase (matrix). In test sample TS1, 18.2 vol. % of crosslinked EPDM powder as the dispersed (island) phase replaced the same volume fraction of EPDM as in CS1. The crosslinked EPDM powder used in the test samples was prepared from recycled, previously crosslinked EPDM materials. Consequently, the graphite filler did not enter the EPDM powder (disperse) phase, and was concentrated within the EPDM matrix during compounding and molding samples.

The thermal conductivity (Tc) of TS1, which include the crosslinked EPDM powder, showed an increase of about 83% (to 1.9 W/mK) or almost double the Tc level of CS1 (1.03 W/mK). Cross-section SEM images taken of the molded plaques of the test sample TS1 composite showed that the graphite was concentrated within the EPDM continuous phase where it formed a thermally conductive pathway. The SEM images showed that there were no graphite platelets in the crosslinked EPDM powder dispersed (island) phase of the TS1 composite.

SEM images of the TS1 composite compared to CS1, showed that the introduction of the EPDM powder also interrupted the orientation of some of the graphite platelets. Without wishing to be bound by theory, it is believed that the re-orientation of the graphite platelets within the EPDM matrix by the crosslinked EPDM powder enhanced the through-plane Tc in the test sample TS1.

In test sample TS2a, a hybrid filler of graphite and spherical Al powder was used to demonstrate the effect on Tc values of crosslinked EPDM as a discontinuous (island) phase dispersed within an EPDM matrix (sea phase). As shown in Table 3, test sample TS2a had a Tc level (2.54 W/m·K) which was double the Tc level for CS2 (1.26 W/m·K). An SEM image showed that the hybrid filler in TS2a was again concentrated within the continuous EPDM matrix phase rather than in the crosslinked EPDM powder phase.

The SEM images also showed that a larger portion of the graphite platelets were oriented in a thickness direction within the test sample TS2a, compared to the CS2 composite in which most of the graphite platelets were oriented in an in-plane direction (i.e. flow direction). The higher Tc values of TS2a demonstrates the effect of the crosslinked EPDM on the orientation of the thermally conductive filler to increase the Tc value of a composite material in the desirable thickness direction.

In test sample TS2b, the amount of EPDM powder was decreased to 12 vol %. The lower Tc value of TS2b compared to TS2a demonstrates the effect of a reduced filler concentration and change in filler orientation within the TS2b composite. However, although the Tc value of TS2b was lower than that of TS2a, the Tc enhancement resulting from the presence of the domains (islands) of the crosslinked EPDM powder was still significant (by ~67%) compared to CS2.

For each of CS2, TS2a and TS2b in Table 3, the compression set values were lower than 30%, which meets the requirements for general sealant applications. However, the addition of 40 vol % fillers increased the Shore A hardness to 90 (Shore A hardness of the non-filled counterpart was ~60), which is considered too high for most of applications relating to sealants and thermal interface materials. However, such compositions are useful for other applications that do not require a lower Shore A hardness value.

Study 2

Test samples were prepared based on test sample TS2b to examine the effect of white mineral oil for reducing the level of Shore A hardness of the composites. Three test samples (T2c, TS2d, TS2e) were prepared according to the formulations provided in Table 4, below. The table includes test sample TS2b as a comparative.

TABLE 4

Formulations containing oil and/or silicone rubber

| Composition (Vol. %) | TS2b (from Table 3) | TS2c | TS2d | TS2e |
|---|---|---|---|---|
| EPDM Nordel ™ IP 4570 | 48 | 16.3 | 12.7 | 12.7 |
| Graphite platelets (Humai) | — | — | 26.7 | — |
| Graphite platelets (Tianheda) 200 mesh | 26.7 | 26.7 | — | — |
| Graphite platelets (Tianheda) 100 mesh | — | — | — | 26.7 |
| Crosslinked EPDM powder | 12 | 12.7 | 12.4 | 12.4 |
| Al powder | 13.3 | 13.3 | 13.3 | 13.3 |
| White Mineral Oil | — | 31.0 | 23.1 | 23.1 |
| Silicone rubber | — | — | 11.8 | 11.8 |
| Luperox F40 Crosslinker[1] | 6.0 | 6.0 | 6.0 | 6.0 |
| Ricon 153D Co-agent[1] | 3.0 | 3.0 | 3.0 | 3.0 |
| Thermal conductivity (W/m · K) | 2.10 | 2.12 | 1.80 | 1.90 |
| Shore A Hardness | 90 | 70 | 62 | 64 |
| Compression set (%) | 25.8 | 18.4 | 17.2 | 23.6 |

[1]The amounts of the crosslinker and the co-agent were based on the total weight of the (uncrosslinked) EPDM interpolymer.

For test sample TS2c, the addition of 31.0 vol % mineral oil significantly decreased Shore A hardness from 90 to 70, compared to TS2b, while the Tc level remained about the same. The compression set was lowered from about 26 to about 18%. Although compression set can vary with different hardness, the compression set of TS2c at about 18% is acceptable for most thermally conductive elastomeric material applications.

For test samples TS2d and TS2e, combining EPDM and mineral oil with a silicone rubber having an intrinsically low Shore A hardness as the matrix, resulted in a further reduced Shore A hardness of 62 and 64 (compared to 70 for TS2c), while compression set was maintained at about 20%. Compared with TS2c, the Tc value of samples TS2d and TS2e decreased to some extent, which may have been due to the lower intrinsic Tc of the silicone rubber (Tc=0.19 W/m·K) compared to the EPDM (EPDM Nordel IP 4570, Tc=0.22 W/m·K).

Study 3

As demonstrated in Study 2, a silicone rubber with low hardness added to an EPDM/oil matrix further reduced Shore A hardness of the composite, compared to the EPDM/oil matrix alone. It is generally known that the low hardness of silicone rubber provides an advantage over EPDM in certain applications.

In this study, the use of a low hardness silicon rubber as the sole matrix component (comparative sample CS3) was examined for developing a soft, thermally conductive rubber compound, and compared to test sample TS2e made with an EPDM/mineral oil/silicone rubber matrix.

Sample CS3 was prepared according to the formulation provided in Table 5, below. The table includes test sample TS2e (from Table 4).

TABLE 5

Comparison of composition based on EPDM/oil versus silicone rubber

| Composition (Vol. %) | TS2e (from Table 4) | CS3 |
| --- | --- | --- |
| EPDM Nordel ™ IP 4570 | 12.7 | — |
| Graphite platelets (Humai) | — | — |
| Graphite platelets (Tianheda) 200 mesh | — | — |
| Graphite platelets (Tianheda) 100 mesh | 26.7 | 26.7 |
| Crosslinked EPDM powder | 12.4 | 12.4 |
| Al powder | 13.3 | 13.3 |
| White Mineral Oil | 23.1 | — |
| Silicone rubber | 11.8 | 47.6 |
| Luperox F40 Crosslinker[1] | 6.0 | 6.0 |
| Ricon 153D Co-agent[1] | 3.0 | 3.0 |
| Thermal conductivity (Tc) (W/m · K) | 1.90 | 1.55 |
| Shore A hardness | 64 | 70 |
| Compression set (%) | 23.6 | 26.1 |

[1]The amounts of the crosslinker and the co-agent were based on the total weight of the (uncrosslinked) EPDM interpolymer and silicon rubber.

As the results in Table 5 show, sample CS3 made with silicone rubber as the sole matrix component had a higher Shore A hardness than TS2e test sample made with the EPDM/oil/silicone rubber matrix. In addition, sample CS3 had a lower Tc value (at 1.55 W/m·K) than the test samples TS2c, TS2d and TS2e, made with an EPDM/oil matrix or an EPDM/oil/silicone rubber matrix (Tc=2.12, 1.80 and 1.90 W/m·K, respectively). Moreover, the use of a matrix based on silicone rubber alone did not show an advantage over the TS2e test sample in terms of compression set.

The results in Table 5 demonstrate that a matrix made of an EPDM/oil mixture or an EPDM/oil/silicone rubber mixture provided a thermally conductive elastomeric composite with a higher Tc, lower hardness and lower compression set than a composite made from a matrix composed of silicone rubber alone.

It is specifically intended that the present invention not be limited to the embodiments and illustrations contained herein, but include modified forms of those embodiments including portions of the embodiments and combinations of elements of different embodiments as come within the scope of the following claims.

We claim:

1. A composition comprising at least the following:
    A) a continuous phase comprising an elastomer selected from the group consisting of an ethylene/α-olefin interpolymer, a propylene/α-olefin interpolymer, a propylene/ethylene interpolymer, and combinations thereof;
    B) a discontinuous phase comprising a crosslinked elastomer dispersed within the continuous phase, the crosslinked elastomer selected from the group consisting of a crosslinked ethylene/α-olefin interpolymer, a crosslinked propylene/α-olefin interpolymer, a crosslinked propylene/ethylene interpolymer, and combinations thereof; and
    C) a thermally conductive filler comprising a plurality of particles dispersed within the continuous phase.

2. The composition of claim 1, wherein the composition has a thermal conductivity of ≥0.5 Watts per meter per Kelvin (W/mK).

3. The composition of claim 1, wherein the filler has a thermal conductivity of ≥20 Watts per meter per Kelvin (W/mK).

4. The composition of claim 1, wherein the filler is selected from the group consisting of graphite, aluminum, aluminum oxide, magnesium oxide, boron nitride, zinc oxide, silicon carbide, aluminum nitride, carbon fiber, silicon nitride, graphene nanoplatelets, zinc sulfide, and combinations thereof.

5. The composition of claim 1, wherein the filler has an aspect ratio of from 1:1 to 1:100.

6. The composition of claim 1, wherein the particles of the filler are in a platy shape, a fibrous form, or a combination thereof.

7. The composition of claim 1, wherein the elastomer of Component A has:
    a density of from 0.8 to 1.4 g/cc, and
    a Mooney Viscosity of from 5 to 150 (ML1+4, 125° C.).

8. The composition of claim 1, wherein the elastomer of the Component A is an ethylene/α-olefin interpolymer.

9. The composition of claim 8, wherein the ethylene/α-olefin interpolymer is ethylene/propylene/diene (EPDM).

10. The composition of claim 1, wherein Components A, B and C are present in an amount ≥95 wt % of the total weight of the composition.

11. The composition of claim 1, wherein the thermally conductive filler of Component C is present in an amount of from 20 to 60 volume percent (vol %) based on the total volume of the composition.

12. The composition of claim 1, wherein
    Component A is present in an amount of 20 to 75 vol %, and
    Component B is present in an amount of 5 to 25 vol %, based on the total volume of the composition.

13. A crosslinked composition formed from the composition of claim 1.

14. An article comprising at least one component formed from the composition of claim 1.

15. The article of claim 14, wherein the article is selected from the group consisting of thermal interface materials and elastomer seals.

* * * * *